(12) United States Patent
Behr (10) Patent No.: US 11,204,318 B2
(45) Date of Patent: Dec. 21, 2021

(54) MECHANICAL MOUNT FOR REMOVABLE FRONT-END OPTICS ON AN OPTICAL SPECTROSCOPY PROBE

(71) Applicant: Tornado Spectral Systems Inc., Mississauga (CA)

(72) Inventor: Bradford B. Behr, Silver Spring, MD (US)

(73) Assignee: Tornado Spectral Systems Inc., Mississauga (CA)

( * ) Notice: Subject to any disclaimer, the term of this patent is extended or adjusted under 35 U.S.C. 154(b) by 0 days.

(21) Appl. No.: 17/133,416

(22) Filed: Dec. 23, 2020

(65) Prior Publication Data

US 2021/0208066 A1 Jul. 8, 2021

Related U.S. Application Data

(60) Provisional application No. 62/956,740, filed on Jan. 3, 2020.

(51) Int. Cl.
*G01J 3/02* (2006.01)
*G01N 21/47* (2006.01)
*G01J 3/44* (2006.01)
*G01N 21/65* (2006.01)

(52) U.S. Cl.
CPC .......... *G01N 21/474* (2013.01); *G01J 3/0202* (2013.01); *G01J 3/44* (2013.01); *G01N 21/65* (2013.01)

(58) Field of Classification Search
CPC ......... G01N 21/474; G01N 21/65; G01J 3/00; G01J 3/02; G01J 3/0202; G01J 3/44; G02B 6/26
See application file for complete search history.

(56) References Cited

U.S. PATENT DOCUMENTS

| 5,112,127 | A | 5/1992 | Carrabba et al. |
| 5,377,004 | A | 12/1994 | Owen et al. |
| 10,261,020 | B2 | 4/2019 | Tedesco et al. |
| 2016/0161705 | A1 | 6/2016 | Marquardt et al. |
| 2020/0057243 | A1* | 2/2020 | Marple ................. G01J 3/0237 |

FOREIGN PATENT DOCUMENTS

WO 2021/134128 A1 7/2021

OTHER PUBLICATIONS

International Search Report and Written Opinion dated Mar. 2, 2021 in International Patent Application No. PCT/CA2020/051797 (9 pages).

* cited by examiner

*Primary Examiner* — Abdullahi Nur
(74) *Attorney, Agent, or Firm* — Bereskin & Parr LLP/S.E.N.C.R.L./s.r.l.; Tony Orsi (57) ABSTRACT

Various embodiments are described that provide an optical spectroscopy probe which has a probe head with a first attachment portion with at least one component having a first shape, a sample optic subassembly with a second attachment portion that is proximal to the probe head and has at least one component with a second shape that is complimentary to the first shape for releasably engaging the first attachment portion of the probe head, and a locking mechanism to hold the sample optic subassembly and the probe head together and constrain relative motion therebetween along at least five degrees of freedom.

17 Claims, 5 Drawing Sheets

MECHANICAL MOUNT FOR REMOVABLE FRONT-END OPTICS ON AN OPTICAL SPECTROSCOPY PROBE

CROSS-REFERENCE TO RELATED APPLICATION

This application claims the benefit of U.S. Provisional Patent Application No. 62/956,740 filed Jan. 3, 2020 and the entire contents of U.S. Provisional Patent Application No. 62/956,740 are hereby incorporated herein in its entirety.

FIELD

Various embodiments are described herein that generally relate to the field of optical spectroscopy and more specifically relates to a Raman spectroscopy sample probe which illuminates a sample with a laser beam and collects light scattered back from the sample where the sample probe has a removable sample optic.

BACKGROUND

Raman spectroscopy is an analytical method wherein a laser beam, containing laser photons having a certain wavelength, illuminates a sample, which may be in solid, crystalline, liquid, or gaseous form, and a small fraction of the laser photons shift to different wavelengths as they scatter from the sample molecules of the sample. The amount of wavelength shift depends on the structure of the sample molecules, so different types of sample molecules will generate different spectral patterns in the scattered light from the sample, which can be analyzed to identify and quantify the chemical composition of the sample. However, the Raman scattering effect is very weak so the wavelength-shifted signal is usually quite faint. As such, it is advantageous to collect as much of the scattered light from the sample as possible, while also illuminating a large enough area or volume of the sample such that the spectroscopic analysis results are representative of the whole sample.

SUMMARY OF VARIOUS EMBODIMENTS

According to one aspect of the teachings herein, there is provided an optical spectroscopy probe comprising: a probe head having a first attachment portion with at least one component having a first shape; a sample optic subassembly that is removably attachable to the probe head, the sample optic subassembly comprising: a second attachment portion that is proximal to the probe head and has at least one component with a second shape that is complimentary to the first shape for releasably engaging the first attachment portion; and a locking mechanism to hold the sample optic subassembly and the probe head together and constrain relative motion therebetween along at least five degrees of freedom.

In at least one embodiment, the first attachment portion of the probe head comprises a socket with a cross-sectional shape and the second attachment portion of the sample optic subassembly comprises a sample optic tube with a proximal portion that has a same cross-sectional shape as the socket portion and slidably engages the socket portion.

In at least one embodiment, the locking mechanism comprises: a groove on a first portion of an exterior surface of the sample optic tube and a socket recess at a second portion of the exterior surface of the sample optic tube; first and second nodes on a first portion of an interior surface of the socket of the probe head that are positioned to mate with the groove on the sample optic tube; and a channel through a second portion of the socket that is aligned with the socket recess of the sample optic tube; and a fastener that engages the channel to hold the sample optic tube fixed to the socket of the probe head.

In at least one embodiment, the locking mechanism comprises: first and second nodes on a first portion of an exterior surface of the sample optic tube and a socket recess at a second portion of the exterior surface of the sample optic tube; a groove on a first portion of an interior surface of the socket of the probe head that are positioned to mate with the first and second nodes on the sample optic tube; a channel through a second portion of the socket that is aligned with the socket recess of the sample optic tube; and a fastener that engages the channel to hold the sample optic tube fixed to the socket of the probe head.

In at least one embodiment, the channel is a threaded channel, and the fastening member is a screw with an end that is shaped to releasably engage the threaded channel of the socket of the probe head and engage the socket recess of the sample optic tube.

In at least one embodiment, the fastening member is a pin with an end that is shaped to releasably engage the channel of the socket of the probe head and engage the socket recess of the sample optic tube.

In at least one embodiment, the first and second nodes are conical.

In at least one embodiment, the first attachment portion of the probe head comprises a first tube and the second attachment portion of the sample optic subassembly comprises a sample optic tube that is adapted to slidably engage the first tube of the probe head in a coaxial fashion.

In at least one embodiment, the sample optic tube is sized to slide over the first tube of the probe head.

In at least one embodiment, the sample optic tube has a socket at a proximal end portion thereof and a tip of the first tube of the probe head is adapted to mate with the socket of the sample optic tube to prevent the tip of the first tube from moving laterally or moving along an optical axis of the sample optic subassembly.

In at least one embodiment, the locking mechanism comprises a slot and a key section with a rib where the rib is sized to mate with the slot to establish a single fixed rotational orientation between the first tube of the probe head and the sample optic tube.

In at least one embodiment, the slot is located on a proximal portion of the sample optic tube and the key section is located on a distal portion of the first tube of the probe head.

In at least one embodiment, the slot is located on a distal portion of the first tube of the probe head and the key section is located on a proximal portion of the sample optic tube.

In at least one embodiment, the locking mechanism is adapted to hold the probe head and the sample optic subassembly in place to prevent lateral shifting of the sample optic subassembly relative to a collimated beam that is generated by the optical spectroscopy probe during use.

In at least one embodiment, the locking mechanism is adapted to hold the probe head and the sample optic subassembly in place to prevent rotation of the sample optic subassembly relative to the probe head.

In at least one embodiment, the first and second attachment portions are shaped to restrict movement along at least two axes and to restrict rotation around all three axes, and the locking mechanism is adapted to hold the probe head and the sample optic subassembly in place so that after the sample optic subassembly is removed the sample optic subassembly is reinstallable in a position such that the optical alignment of the optical spectroscopy probe is substantially the same as before removal of the sample optic assembly.

The text "substantially the same" depends on the particular embodiment of the probe since in some cases a difference in alignment of 10% is considered "substantially the same" since variation in position within 10% does not affect optical performance while in other example embodiments, an alignment difference of 1% is considered "substantially the same" since variation in position within 1% does not affect optical performance.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, optical or electrical connotation. For example, as used herein, the terms coupled or coupling can indicate that two elements or devices can be directly connected to one another or connected to one another through one or more intermediate elements or devices via an electrical signal, an electrical connection, a mechanical element, an optical element, or a light pathway depending on the particular context.

It should also be noted that, as used herein, the wording "and/or" is intended to represent an inclusive-or. That is, expressions such as "X and/or Y" are intended to mean X or Y or both, for example. As a further example, expressions such as "X, Y, and/or Z" are intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

In one aspect, the present teachings provide a novel implementation of a Raman "probe", which is the optical and mechanical subsystem of a Raman analyzer system that interfaces with a sample under study. In many Raman analyzer systems (such as Raman system 100 illustrated in FIG. 1), a probe 102 is connected to a main analyzer unit 104 via a pair of optical fiber cables: one or more "excitation fibers" 106 for transmitting laser energy from the analyzer unit 104 to the probe 102 and one or more "collection fibers"

Figure 1:
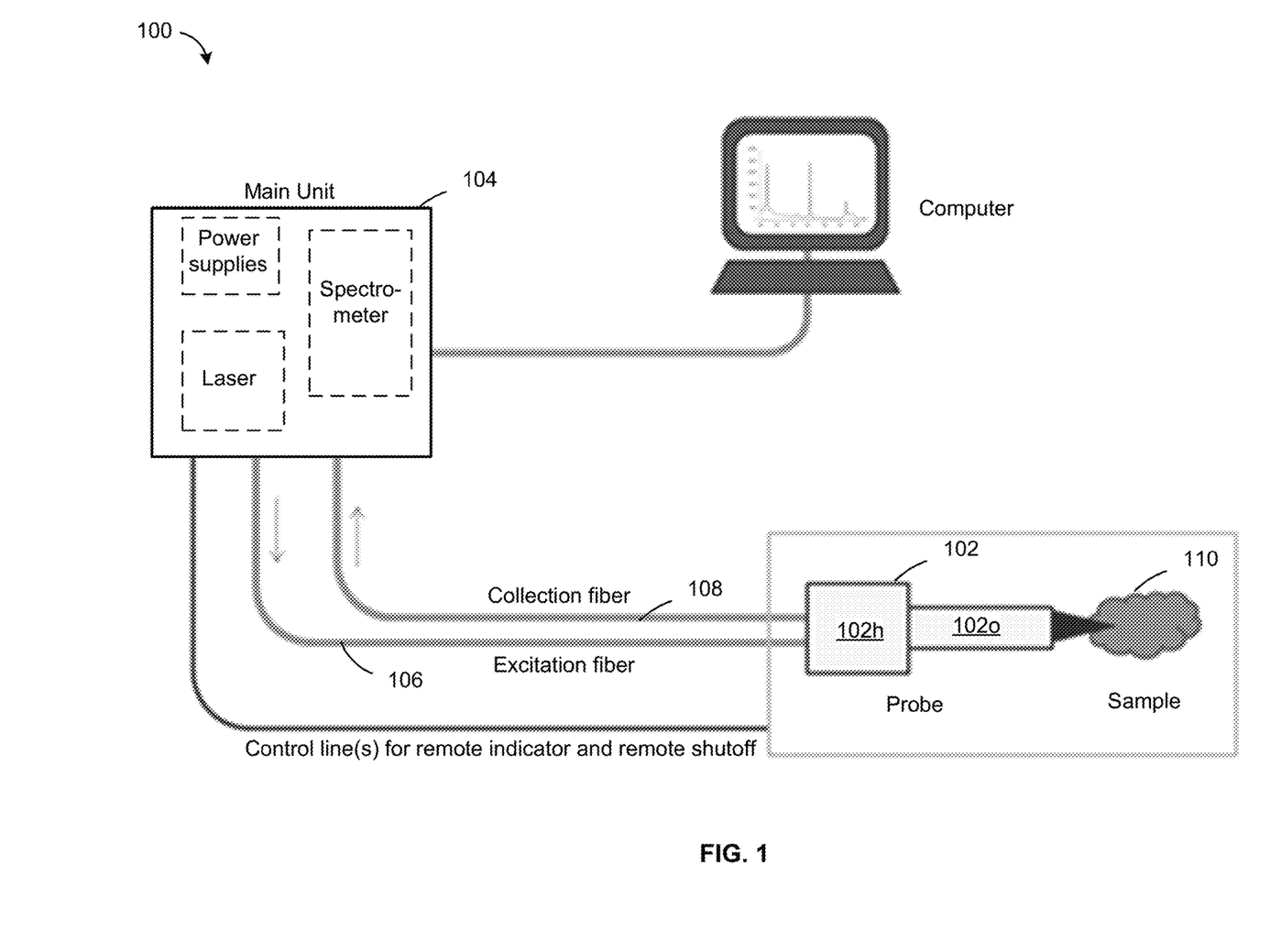
FIG. 1 shows a representative Raman spectroscopy system, illustrating the relationships among a main analyzer unit (containing a laser, a spectrometer, and power supplies), a probe, and a control computer.

108 for transmitting the scattered light signal collected by the probe 102 from a sample 110 back to the analyzer unit 104.

Figure 2:
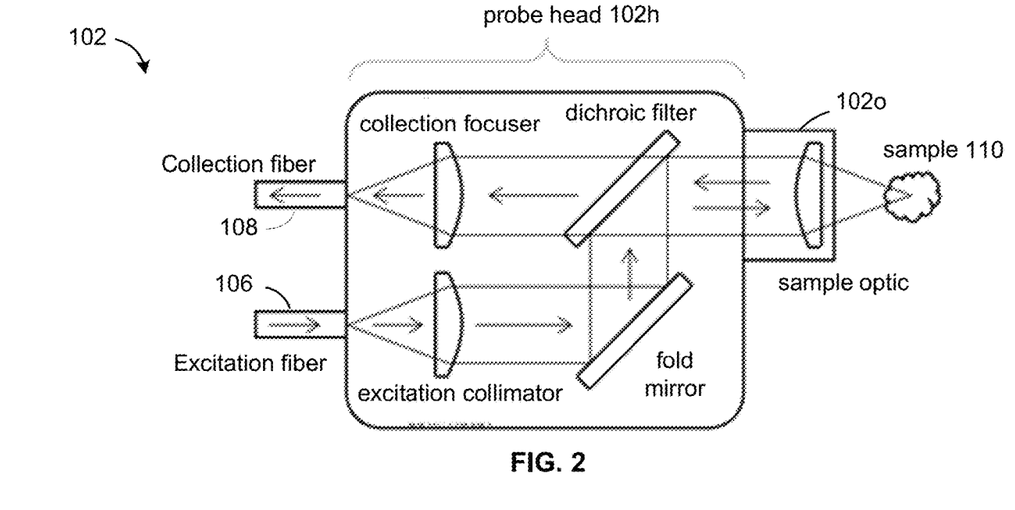
FIG. 2 is an illustration of a typical probe head and a sample optic configuration.

The probe 102 is further divided into two broad parts, the "probe head" 102h and the "sample optic" 102o, as shown in FIG. 2. The probe head 102h typically contains optical elements for collimating a diverging laser light beam emitted from the excitation fiber 106 and directing this collimated beam to the sample optic 102o, which in this example is an excitation collimator, and a fold mirror. Other optical elements within the probe head 102h include a dichroic filter for receiving and filtering the collimated beam of scattered light returning from the sample optic 102o to remove non-Raman-scattered light, and a collection focuser which then focuses the filtered scattered return light down into the collection fiber 108.

For some spectroscopic measurement applications, the sample optic (or at least one surface of the sample optic) makes direct contact with the sample 110. For example, with liquid samples, one often uses "immersion probes" where the sample optic is located at the end of a long tube (also known as an immersion tube) which is placed directly into the liquid sample. The collimated excitation beam travels down the interior of the tube and is focused by the sample optic, creating a focal spot within the sample or at the interface between the distal portion of the sample optic and the proximal surface of the liquid sample. Scattered light from the liquid sample is collected and substantially collimated by the same sample optic, and the collimated collection beam travels back through the interior of the tube to the probe head 102h, where it is optically filtered and delivered to the collection fiber 108. It should be noted that immersion probes are often oriented vertically, but there are ways to mount an immersion probe horizontally or at an angle.

Additionally, in situations where the sample 110 is sensitive to external contamination, which is a particular concern for many biomedical and biopharmaceutical process applications, then the sample optic may need to be sterilized prior to use via autoclaving, gamma irradiation, or some other sterilization method. The optical elements in the probe head 102h typically cannot be subjected to high temperatures or radiation, so the sample optic 102o is adapted to be detached from the probe head 102h, sterilized, and then reattached to the probe head 102h. However, the intensity of the measured spectroscopic signal is highly sensitive to the position of the sample optic 102o relative to the collimated beam emanating from the probe head 102h, so if the sample optic 102o is removed from the probe head 102h for sterilization and then reattached in a slightly different position or orientation, the strength of the observed spectroscopic signal can change by a significant amount and the quantitative analysis of the spectra may be inaccurate.

In one aspect, the present teachings incorporate structural elements that provide for a highly reproducible mechanical positioning of a removable and re-attachable sample optic subassembly of a spectroscopic probe by utilizing a kinematic mount. A kinematic mount has not previously been applied to a removable sample optic subassembly for spectroscopic probes.

Figure 3:
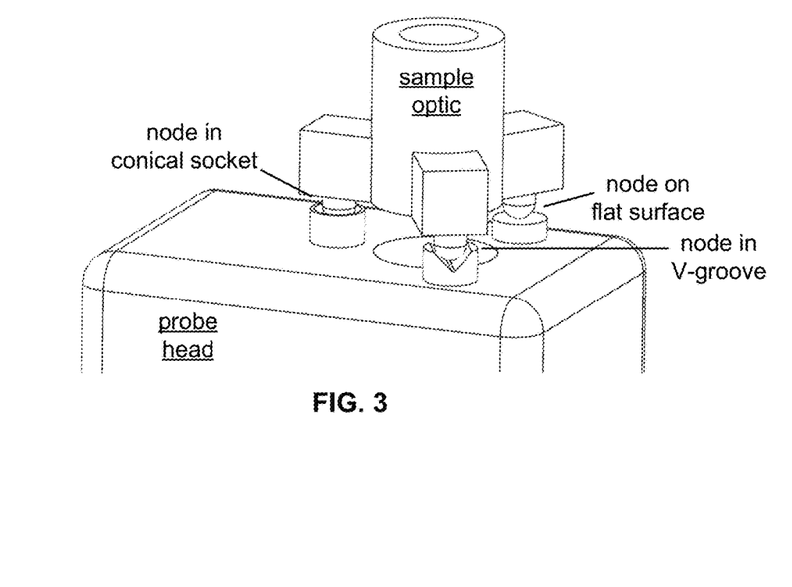
FIG. 3 is an Illustration of an example embodiment of a sample optic which is kinematically mounted on to a probe head using a three-node configuration.
Figure 4A:
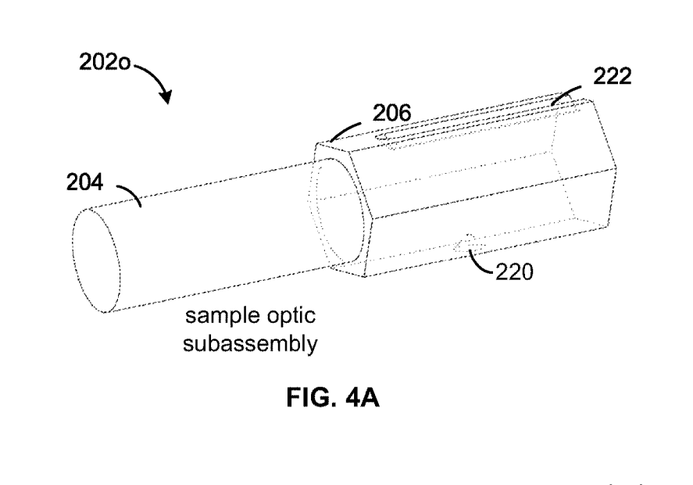
FIGS. 4A-4E show illustrations of an alternative example embodiment of a kinematic mount for a probe head and a sample optic subassembly having a sample optic tube where a perspective view of the sample optic tube is shown in FIG. 4A, a perspective view of a probe head is shown in FIG. 4B, and a perspective view, a side view and an end view of the sample optic tube mounted to the probe head are shown in FIGS. 4C-4E, respectively.
Figure 4B:
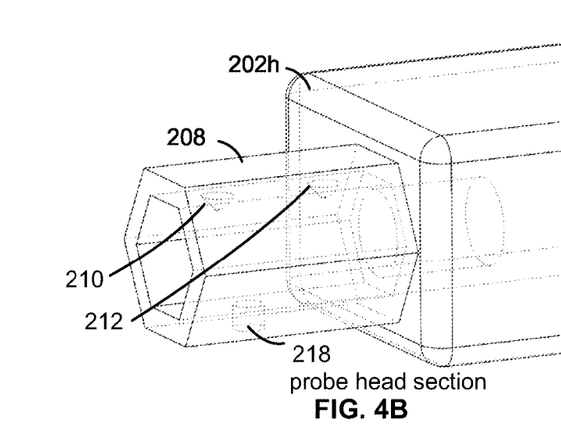
Figure 4C:
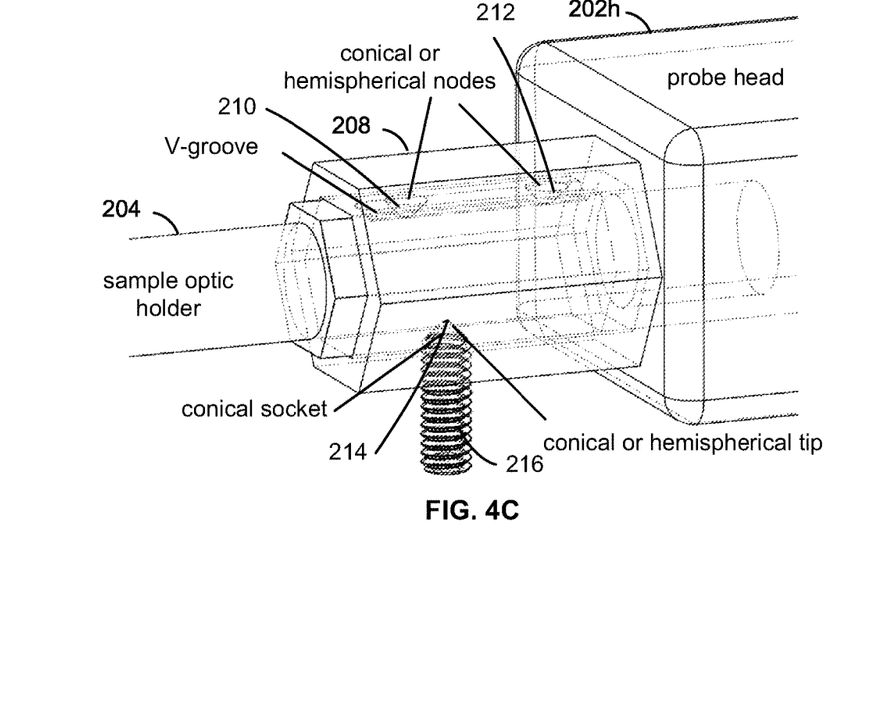
Figure 4D:
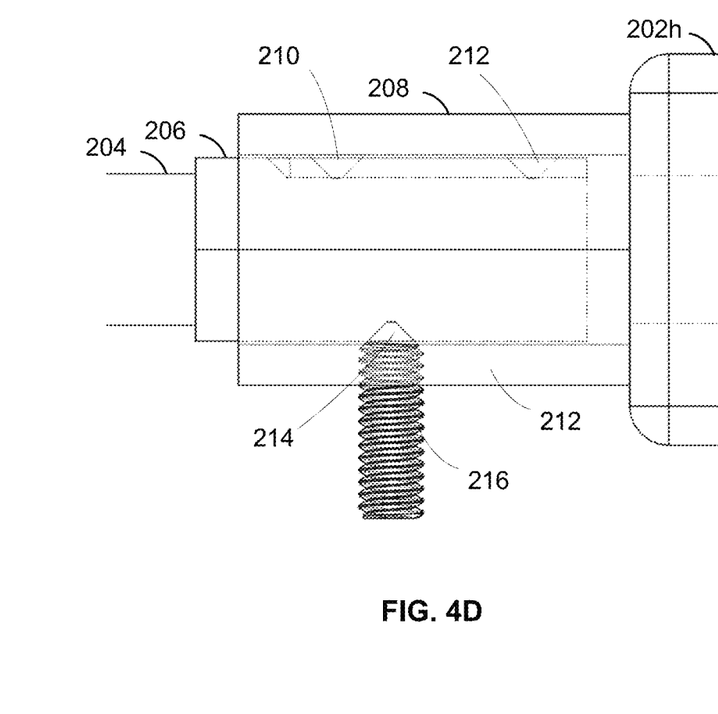
Figure 4E:
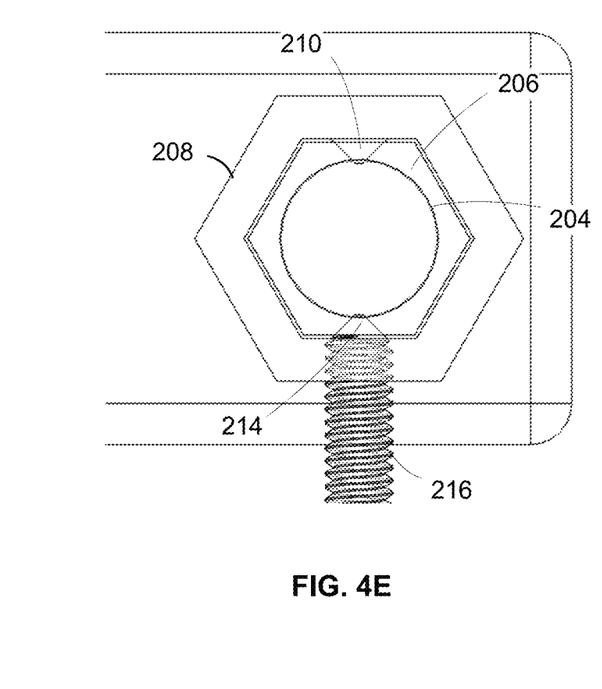

In a kinematic mount, two mechanical subassemblies can be structured to fit together such that all six degrees of freedom (i.e. the positioning in each of three orthogonal axes, and the rotation around each of the three orthogonal axes) are precisely determined but not overdetermined. In other words, there is one and only one stable position and orientation for the two subassemblies relative to each other. For example, as illustrated in FIG. 3, one common embodiment of a kinematic mount uses three hemispherical "nodes" that are securely attached to a first subassembly (such as the sample optic) such that they are not placed along a straight line, and three matching "sockets" for those hemispherical nodes on the second subassembly (such as the probe head) that are placed in positions that correspond to the positions of the three hemispherical nodes.

Of these three sockets, the first socket (e.g. with a conical shape) constrains motion in both horizontal axes, the second socket (e.g. a V-groove) constrains motion along only one horizontal axis while permitting motion along the orthogonal horizontal axis, and the third socket (e.g. a flat surface) permits motion along both horizontal axes. These sockets can be ordered in any fashion.

If a force is applied to the second subassembly so that it is urged towards the first subassembly, the positions of the hemispherical nodes are maintained within their respective sockets and no horizontal motion, vertical motion, or rotation is possible. For example, the hemispherical nodes and the matching sockets may be held together by a locking mechanism. The locking mechanism can be implemented in a number of different ways. For example, the nodes and the sockets may be magnetized so they are pulled together by the magnetic force. Alternatively, springs or screws alongside the nodes and sockets may pull them together to maintain the relative position of the two subassemblies.

If one subassembly is part of the probe head, and the other subassembly is part of the removable sample optic, then the sample optic may be removed and then reinstalled in substantially the same location and orientation relative to the collimated excitation beam exiting the probe head. In this manner, the probe head has a first attachment portion, which includes the hemispherical nodes or the respective sockets. Likewise, the sample optic subassembly has a second attachment portion, which includes the sockets when the probe head includes the nodes or the nodes when the probe head includes the sockets.

Other geometric configurations may be implemented which have nodes and sockets that are implemented differently. These alternative implementations may be advantageous depending on the available space where the probe will be mounted, access to the locking mechanism that is used to releasably attach the probe head and the sample optic subassembly together, the temperature and vibration environment of the measurement site, and other factors specific to a particular use case. For example, access to the locking mechanism is easier with the embodiment of FIG. 3 as the locking mechanism is made up of components on the exterior surfaces of the probe head and sample optic. By way of another example, if the components making up the locking mechanism was used in an environment where the temperature changed significantly, if the thermal expansion and contraction were not taken into account for the materials used for the components that make up the locking mechanism then this temperature change would otherwise cause the nodes to shift position and deleteriously affect the optical alignment. In another example, if the components making up the locking mechanism were expected to be subjected to strong shocks and/or vibrations during use, then the nodes and locking mechanisms may be implemented to be resistant to damage or misalignment under these motions (i.e. shocks and/or vibrations).

By way of example, but not limiting the scope of the claimed subject matter, FIGS. 4A-4E shows an example embodiment of a kinematic mount which is particularly suited to the spectroscopic immersion probe scenario. A sample optic subassembly comprising a sample optic tube 204 holds (i.e. provides a housing for) sample optic 202o (which may be located at the distal end of sample optic tube 204 but is not shown in the figure) and includes a proximal portion having a hexagonal end portion 206 which slidably engages a hexagonal socket 208 in a probe head 202h. In this case, the inner dimensions of the socket 208 are slightly larger than the exterior dimensions of hexagonal end portion 206, such that the two structures do not form a friction fit. Typical sizes may be about 5 to 25 mm in cross-sectional dimension, but smaller or larger sizes may be embodied for specific cases. Inside the hexagonal socket 208 are two fixed hemispherical or conical nodes 210 and 212 and there is a third hemispherical or conical node 214 on the end of an adjustable screw 216.

The hexagonal end 206 of sample optic tube 204 is inserted into the socket 208 and then the adjustable screw 216 is inserted through threaded hole 218 (i.e. threaded channel) such that the conical node 214 on the end of the screw 216 fits within a conical socket 220 at the bottom surface of the sample optic tube 204. The screw 216 is then tightened to lock the sample optic tube 204 into position. When the proximal end of the sample optic tube 204 is inserted within the socket 208 the two nodes 210 and 212 that protrude from the upper interior of the socket 208 both slide into a V-groove 222 on the top of the hexagonal end portion 206 of the sample optic tube 204, and the conical node 214 of the adjustable screw 216 inserts into the conical socket 220 (i.e. a socket recess) on the bottom of the hexagonal end portion 206 of the sample optic tube 204. As long as positive contact is maintained at all three nodes 210, 212 and 214, the sample optic tube 204 cannot rotate, tip, tilt, or translate relative to the probe head 202h. Once assembled, the optical performance of the probe system can be characterized by using a spectrometer calibration procedure, after which the sample optic tube 204 can then be removed for autoclaving or another sterilization procedure (or for any other reason), and then the precise alignment between sample optic tube 204 and the probe head 202h can be restored without having to repeat the calibration procedure. In this example embodiment, a locking mechanism is provided by the nodes 210, 212, and 214, the socket recess 220, the channel 218 and the screw 216.

In an alternative embodiment, the channel is a smooth or threaded channel and a pin or a post with a conical end is inserted through the channel (i.e. a variation of the channel 218) such that the conical node on the end of the pin fits within a conical socket 220 at the bottom surface of the sample optic tube 204. The pin forms a friction fit with the channel and the conical socket 220 to lock the sample optic tube 204 into position. An end of the pin may protrude from the outer surface of the socket 208 of the probe head 202h so that it can be pulled when the sample optic subassembly is to be separated from the probe head 202h. In this example embodiment, the locking mechanism is provided by the nodes 210, 212, and 214, the channel, the socket recess 220 and the pin.

In this example embodiment, the probe head has a first attachment portion, which includes the socket 208 with the nodes 210 and 212, screw or pin 216 and channel 218. The sample optic subassembly has a second attachment portion, which includes the hexagonal end portion 206, the groove 222 and sockets when the probe head includes the nodes or the nodes when the probe head includes the socket 220.

In an alternative embodiment, instead of using sockets with hexagonal end portions, a different cross sectional shape may be used such as triangular, square, rectangular, pentagonal and so on.

Additionally, or in a further alternative embodiment, instead of using conical shapes for the nodes 210, 212 and 220, other shapes can be used such as hemispherical, cylindrical, elliptical, triangular, rectangular or square.

It should be noted that for a sample optic that interfaces with a collimated excitation beam, a constraint of fewer than six degrees of freedom may be sufficient. For instance, small changes in the position of the sample optic along the primary optical axis of the collimated beams may make little or no difference in the optical performance of the fully assembled system. The mechanical aspects of the kinematic mounting system may therefore only constrain five of the six degrees of freedom, permitting different positions of the sample optic along the sixth axis (i.e. the primary optical axis) over a range of positions which will not substantially change the optical performance of the optical system. Embodiments which constrain fewer than six degrees of freedom may be simpler to manufacture and maintain, may be more robust when the system is subject to shock or vibration, or alternatively may provide adaptability in situations where the mechanical parts are subject to thermal expansion and contraction.

Figure 5:
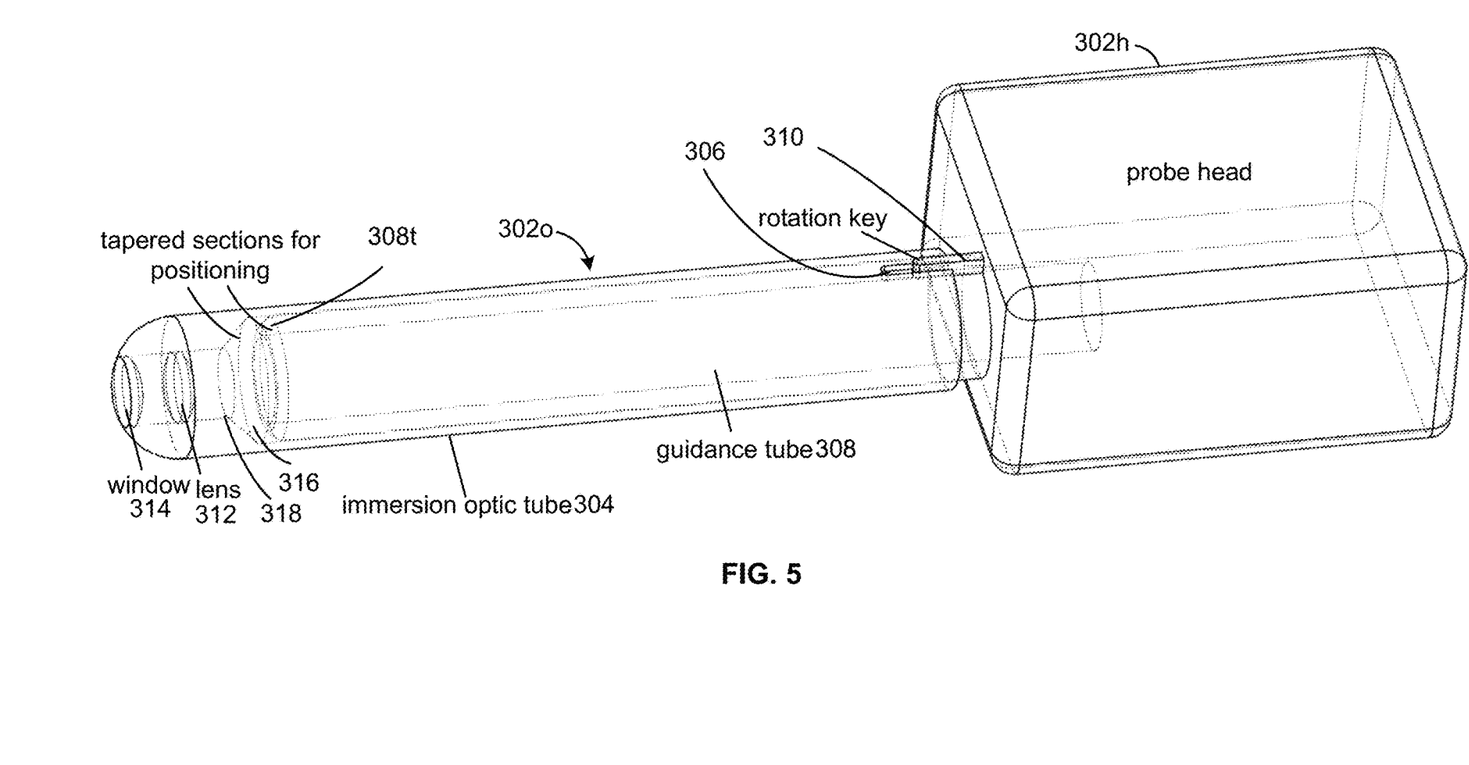
FIG. 5 is an illustration of an alternative example embodiment of a kinematic mounting principle suitable for an immersion probe with a removable immersion optic tube.

In another aspect, there is provided an example embodiment shown in FIG. 5, wherein a smaller diameter hollow first tube 308 (a "guidance tube") is permanently mounted to the probe head 302h, and a larger diameter hollow second tube 304 (an "immersion optic tube") holds the sample optic (e.g. one or more focusing lenses 312 plus an optional sample-facing window 314). Element 318 is a narrower part of the aperture through which light beams travel. The small tube 308 fits snugly inside the large tube 304. Although various sizes may be employed for the diameter of the outer tube 304, an immersion optic tube 304 with an external diameter of about 12 mm may be sufficient for use in many biopharmaceutical systems, in which case the interior diameter of the optic tube 304 may be about 10 mm (providing a 1 mm tube wall thickness), and the small tube 308 may have an exterior diameter of about 9.9 mm and an interior diameter of 8 mm.

Tip 308t of the small tube 308 matches with a conical socket 316 near a proximal end of the large tube 304 so that when the small tube 308 is fully inserted into the large tube 304, the tip 308t of the small tube 308 cannot move laterally or along the optical axis (along which the collimated light beams are travelling), which substantially corresponds to the longitudinal axial centerlines of the two tubes. At a portion of the small tube 308, close to the probe head 302h, there is a narrow "key" section 310 on the outside of the guidance tube 308 which mates with a slot 306 along a portion of the immersion sample optic tube 304 close to the probe head 302h, establishing a single fixed rotational orientation between the two tubes 304 and 308. In an alternative embodiment, the key section 310 may be located on an inner surface of the proximal portion of the sample optic tube 304 and the slot 306 may be located on a distal portion of the tube 308 of the probe head 302h.

In a typical vertical orientation, with the probe head 302h at the top and window 314 at the bottom, if probe head 302h were directly above the two tubes, a distal portion of the large tube 304 is securely connected to a container (not shown) that holds the liquid sample (not shown). The probe head 302h and the small tube 308 are pulled downwards by gravity and are held up primarily by the tip 308t resting upon the conical socket 316. The lengths of the large tube 304 and the small tube 308 and/or the length of the key 310 and slot 306 are selected so that the key section 310 slides into the slot 306 most of the way but not all the way to the "bottom"

of the slot 306. For example, the tip of the "rib" key section 310 may come to within about 0.5 mm of the bottom of the slot 306 to provide a gap. This gap may be advantageous in not interfering with other axes of the alignment while the engagement between the key section 310 and the slot 306 prevents rotation of the tubes 304 and 308 with respect to one another. In this example embodiment, the locking mechanism is provided by the slot 306 and the key section 310 which may be sized such that they engage one another through a "friction fit" that is reversible so that the two tubes 304 and 308 can be released from one another.

In this example embodiment, the probe head has a first attachment portion, which includes the guidance tube 308, the tip 308t and the rotation key 310. The sample optic subassembly has a second attachment portion, which includes the immersion optic tube 304, the slot 306 and the conical socket 316.

In alternative embodiments, the tip 308t and the socket 316 can have other shapes other than conical such that these shapes mate with one another. These shapes can be hemispherical, square, rectangular, triangular or elliptical.

In alternative embodiments, the circumferential positions of the key section 310 and the slot 306 may be varied (e.g. they may be at the 3 o'clock, 6 o'clock or 9 o'clock position) but they are still aligned with one another. In these other orientations, there may be an additional locking mechanism (not shown) on the tubes 304 and 308 near the probe head 302h, which keeps the large tube 304 from sliding off of the small tube 308. The additional locking mechanism may be implemented by: (a) using a threaded collar that surrounds both tubes, (b) using one or more setscrews to secure the larger tube 304 to the probe head 302h and the smaller tube 308, (c) using magnets mounted on both the large tube 304 subassembly and the probe head 302h, or (d) any other apparatus which pulls the large tube 304 towards the probe head 302h and holds it in a secure position.

Accordingly, the general configuration of the embodiment shown in FIG. 5, whether it be in a vertical orientation or another orientation, provides highly reproducible positioning of the sample optic similar to the embodiment shown in FIGS. 4A-4E, but it may be less prone to flexure of the mechanical parts and thus better reproducibility of optical performance.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. An optical spectroscopy probe comprising:
a probe head having a first attachment portion with at least one component having a first shape;
a sample optic subassembly that is removably attachable to the probe head, the sample optic subassembly comprising:
a second attachment portion that is proximal to the probe head and has at least one component with a second shape that is complimentary to the first shape for releasably engaging the first attachment portion; and
a locking mechanism to hold the sample optic subassembly and the probe head together and constrain relative motion therebetween along at least five degrees of freedom.

2. The optical spectroscopy probe of claim 1, wherein the first attachment portion of the probe head comprises a socket with a cross-sectional shape and the second attachment portion of the sample optic subassembly comprises a sample optic tube with a proximal portion that has a same cross-sectional shape as the socket and slidably engages the socket.

3. The optical spectroscopy probe of claim 2, wherein the locking mechanism comprises: a groove on a first portion of an exterior surface of the sample optic tube and a socket recess at a second portion of the exterior surface of the sample optic tube; first and second nodes on a first portion of an interior surface of the socket of the probe head that are positioned to mate with the groove on the sample optic tube; a channel through a second portion of the socket of the probe head that is aligned with the socket recess of the sample optic tube; and a fastener that is adapted to releasably engage the channel to hold the sample optic tube fixed to the socket of the probe head.

4. The optical spectroscopy probe of claim 2, wherein locking mechanism comprises:
first and second nodes on a first portion of an exterior surface of the sample optic tube and a socket recess at a second portion of the exterior surface of the sample optic tube;
a groove on a first portion of an interior surface of the socket of the probe head that are positioned to mate with the first and second nodes on the sample optic tube;
a channel through a second portion of the socket that is aligned with the socket recess of the sample optic tube; and
a fastener that engages the channel to hold the sample optic tube fixed to the socket of the probe head.

5. The optical spectroscopy probe of claim 3, wherein the channel is a threaded channel, and the fastening member is a screw with an end that is shaped to releasably engage the threaded channel of the socket of the probe head and engage the socket recess of the sample optic tube.

6. The optical spectroscopy probe of claim 3, wherein the fastening member is a pin with an end that is shaped to releasably engage the channel of the socket of the probe head and engage the socket recess of the sample optic tube.

7. The optical spectroscopy probe of claim 3, wherein the first and second nodes are conical.

8. The optical spectroscopy probe of claim 1, wherein the first attachment portion of the probe head comprises a first tube and the second attachment portion of the sample optic subassembly comprises a sample optic tube that is adapted to slidably engage the first tube of the probe head in a coaxial fashion.

9. The optical spectroscopy probe of claim 8, wherein the sample optic tube is sized to slide over the first tube of the probe head.

10. The optical spectroscopy probe of claim 8, wherein the sample optic tube has a socket at a proximal end portion thereof and a tip of the first tube of the probe head is adapted to mate with the socket of the sample optic tube to prevent the tip of the first tube from moving laterally or moving along an optical axis of the sample optic subassembly.

11. The optical spectroscopy probe of claim 8, wherein the locking mechanism comprises a slot and a key section with a rib where the rib is sized to mate with the slot to establish a single fixed rotational orientation between the first tube of the probe head and the sample optic tube.

12. The optical spectroscopy probe of claim 11, wherein the slot is located on a proximal portion of the sample optic tube and the key section is located on a distal portion of the first tube of the probe head.

13. The optical spectroscopy probe of claim 11, wherein the slot is located on a distal portion of the first tube of the probe head and the key section is located on a proximal portion of the sample optic tube.

14. The optical spectroscopy probe of claim 1, wherein the locking mechanism is adapted to hold the probe head and the sample optic subassembly in place to prevent lateral shifting of the sample optic subassembly relative to a collimated beam that is generated by the optical spectroscopy probe during use.

15. The optical spectroscopy probe of claim 1, wherein the locking mechanism is adapted to hold the probe head and the sample optic subassembly in place to prevent rotation of the sample optic subassembly relative to the probe head.

16. The optical spectroscopy probe of claim 1, wherein the first and second attachment portions are shaped to restrict movement along at least two axes and to restrict rotation around all three axes, and the locking mechanism is adapted to hold the probe head and the sample optic subassembly in place so that after the sample optic subassembly is removed, the sample optic subassembly is reinstallable in a position such that the optical alignment of the optical spectroscopy probe is substantially the same as before removal of the sample optic assembly.

17. The optical spectroscopy probe of claim 1, wherein the optical spectroscopy probe comprises a plurality of discrete contact points between the first attachment portion, the second attachment portion, and the locking mechanism that are arranged to provide a kinematic mount that allows only one relative position and orientation of the probe head and the sample optic subassembly in five or more degrees of freedom and constrains relative motion of the probe head and the sample optic subassembly in six degrees of freedom.

* * * * *